United States Patent
Gerlach

(10) Patent No.: US 8,176,726 B2
(45) Date of Patent: May 15, 2012

(54) METHOD FOR INTRODUCING A REAGENT MEDIUM INTO AN EXHAUST GAS CONDUIT OF AN INTERNAL COMBUSTION ENGINE, AND APPARATUS FOR CARRYING OUT THE METHOD

(75) Inventor: Michael Gerlach, Waiblingen-Neustadt (DE)

(73) Assignee: Robert Bosch GmbH, Stuttgart (DE)

( * ) Notice: Subject to any disclaimer, the term of this patent is extended or adjusted under 35 U.S.C. 154(b) by 864 days.

(21) Appl. No.: 11/579,513

(22) PCT Filed: Apr. 1, 2005

(86) PCT No.: PCT/EP2005/051479
§ 371 (c)(1),
(2), (4) Date: Aug. 20, 2007

(87) PCT Pub. No.: WO2005/108753
PCT Pub. Date: Nov. 17, 2005

(65) Prior Publication Data
US 2008/0264041 A1 Oct. 30, 2008

(30) Foreign Application Priority Data
May 5, 2004 (DE) .......................... 10 2004 022 115

(51) Int. Cl.
*F01N 3/00* (2006.01)
(52) U.S. Cl. ................. 60/277; 60/274; 60/286; 60/295; 60/301; 701/34
(58) Field of Classification Search .................... 60/277, 60/286, 295, 274, 297, 303; 73/1.57–1.72
See application file for complete search history.

(56) References Cited

U.S. PATENT DOCUMENTS

| | | | | |
|---|---|---|---|---|
| 5,808,189 | A | * | 9/1998 | Toyoda ....................... 73/114.37 |
| 5,983,714 | A | * | 11/1999 | Izumiura et al. ........... 73/114.43 |
| 6,024,064 | A | | 2/2000 | Kato et al. |
| 6,038,912 | A | | 3/2000 | Isobe |
| 6,076,504 | A | | 6/2000 | Stavnheim et al. |
| 6,273,120 | B1 | | 8/2001 | Hofmann |
| 6,422,001 | B1 | * | 7/2002 | Sherman et al. ................ 60/274 |
| 6,470,673 | B1 | * | 10/2002 | van Nieuwstadt et al. ..... 60/274 |
| 6,947,831 | B2 | * | 9/2005 | van Nieuwstadt ............ 701/114 |
| 7,243,021 | B2 | * | 7/2007 | Hasegawa ..................... 701/114 |

(Continued)

FOREIGN PATENT DOCUMENTS

DE  19618932  11/1997

(Continued)

*Primary Examiner* — Thomas Denion
*Assistant Examiner* — Jesse Bogue
(74) *Attorney, Agent, or Firm* — Kenyon & Kenyon LLP

(57) ABSTRACT

A method for introducing a reagent medium into an exhaust gas conduit of an internal combustion engine, and an apparatus for carrying out the method. Provision is made for a diagnosis of the pressure sensor. In at least one first time interval in which a steady pressure state is expected, a check is made as to whether the pressure signal at least approximately corresponds to the steady-state pressure. In at least one second time interval in which a pressure change occurs, a check is made as to whether the pressure signal at least approximately corresponds to a predetermined test pressure and/or at least approximately exhibits a predetermined change with respect to the steady-state pressure. A fault signal is supplied if at least one of the conditions is not met.

25 Claims, 2 Drawing Sheets

U.S. PATENT DOCUMENTS

| | | |
|---|---|---|
| 2002/0035866 A1 | 3/2002 | Muller |
| 2004/0177606 A1* | 9/2004 | Scharsack ....................... 60/286 |
| 2004/0200271 A1* | 10/2004 | van Nieuwstadt ........... 73/118.1 |
| 2005/0005912 A1* | 1/2005 | Joos et al. .................... 123/458 |
| 2011/0000196 A1* | 1/2011 | Kasahara ........................ 60/286 |

FOREIGN PATENT DOCUMENTS

| | | |
|---|---|---|
| DE | 19925099 | 12/2000 |
| DE | 101 39 142 | 2/2003 |
| JP | 60216049 | 10/1985 |
| JP | 1-089047 | 4/1989 |
| JP | 6-330732 | 11/1994 |
| JP | 11108304 | 4/1999 |
| JP | 11132030 | 5/1999 |
| JP | 2001173507 | 6/2001 |
| JP | 2002213231 | 7/2002 |
| WO | WO 95/06814 | 3/1995 |
| WO | WO 01/02720 | 1/2001 |
| WO | WO/02/101209 | * 12/2002 |
| WO | WO 02/101209 | 12/2002 |
| WO | WO/03/027472 | * 4/2003 |

* cited by examiner

METHOD FOR INTRODUCING A REAGENT MEDIUM INTO AN EXHAUST GAS CONDUIT OF AN INTERNAL COMBUSTION ENGINE, AND APPARATUS FOR CARRYING OUT THE METHOD

BACKGROUND INFORMATION

German Patent Application No. DE 101 39 142 describes an exhaust gas treatment apparatus of an internal combustion engine in which, in order to reduce NOx emissions, a selective catalytic reduction (SCR) converter is used which, with ammonia as the reducing agent, reduces the nitrogen oxides contained in the exhaust gas to nitrogen. The ammonia is obtained, in a hydrolysis catalytic converter disposed upstream from the SCR converter, from a urea-water solution. The hydrolysis catalytic converter reacts the urea contained in the urea-water solution with water to produce ammonia and carbon dioxide. To ensure precise dosing, provision is made for ascertaining the concentration of the urea-water solution.

The urea-water solution is brought to a predetermined pressure using a pump. A metering valve defines a predetermined flow rate. Compressed air is mixed into the urea-water solution in a mixing chamber. The urea-water solution is sprayed, together with the mixed-in air, into the exhaust gas of the internal combustion engine in such a way that a largely uniform inflow into the SCR converter is achieved.

A previously unpublished patent application of the Applicant describes a method and an apparatus of the species in which a pressurized reagent medium is likewise sprayed into the exhaust gas of an internal combustion engine upstream from an SCR converter. The reagent medium pressure is defined to a predetermined reagent medium target pressure as a function of a parameter. An operating variable of the internal combustion engine and/or a parameter of the exhaust gas of the internal combustion engine can be employed as a parameter. The predetermined reagent medium pressure target value is regulated in the context of a closed-loop control system in which the actual reagent medium pressure is sensed by a reagent medium pressure sensor. Compressed air can be mixed into the reagent medium. The compressed air pressure can likewise be regulated, as a function of the parameter and in the context of a closed-loop control system, to a predetermined compressed air pressure target value, the actual compressed air pressure being sensed by a compressed air pressure sensor. A defect in at least one of the pressure sensors can result in decreased SCR converter performance, with the consequence that unpurified exhaust gas can enter the environment.

It is an object of the present invention to provide a method for introducing a reagent medium into an exhaust gas conduit of an internal combustion engine, and an apparatus for carrying out the method, which ensure that at least one predetermined pressure is maintained.

SUMMARY OF THE INVENTION

The procedure according to the present invention for introducing a reagent medium into an exhaust gas conduit of an internal combustion engine, in which conduit at least one pressure sensor is provided for sensing a pressure, provides for a diagnosis of the pressure sensor. In at least one first time interval in which a steady pressure state is expected, provision is made for a check as to whether the pressure sensor signal at least approximately corresponds to the steady-state pressure. Furthermore, in at least one second time interval in which a pressure change occurs, a check is made as to whether the pressure sensor signal at least approximately corresponds to a predetermined test pressure and/or at least approximately exhibits a predetermined change with respect to the steady-state pressure. A fault signal is supplied if at least one of the conditions is not met.

The procedure according to the present invention makes possible a comprehensive diagnosis of the at least one pressure sensor, ensuring proper operation of the pressure sensor. The introduction, as a function of the pressure signal, of the reagent medium into the exhaust conduit of the internal combustion engine can be accomplished optimally by maintaining a predetermined reagent medium pressure and/or a predetermined compressed air pressure, so that an exhaust gas treatment apparatus such as, for example, an SCR converter can achieve optimum purification results with the least possible reagent medium consumption.

One embodiment provides for the fault signal to be supplied if the pressure signal does not correspond to the steady-state pressure and if, simultaneously, the pressure signal does not correspond to the predetermined test pressure and/or does not exhibit the predetermined change. With this embodiment, the reliability of the diagnosis of the at least one pressure sensor is enhanced. Erroneous supplying of the fault signal can be avoided. For example, unusual environmental influences can cause the fault signal to be supplied even though the pressure sensor is probably in working order.

An embodiment provides for a pressureless state to exist in the first time interval, and that a check is made as to whether the pressure signal at least approximately corresponds to ambient atmospheric pressure. An alternative embodiment provides for a predetermined operating pressure to exist in the first time interval.

An embodiment provides for a check being made, at a measurement time located in the second time interval, as to whether the pressure signal at least approximately corresponds to a test pressure. An alternative or additional embodiment provides that in the second time interval, the difference quotient and/or the differential quotient of the time profile of the pressure signal is ascertained and evaluated.

Another embodiment provides for the second time interval to be located in the follow-on period of a control system, during which the internal combustion engine has already been switched off. This embodiment offers an expanded diagnostic capability by taking into account a pressure drop in the reagent medium pressure and/or the compressed air pressure occurring at the end of the internal combustion engine's operating period.

DETAILED DESCRIPTION

Figure 1:
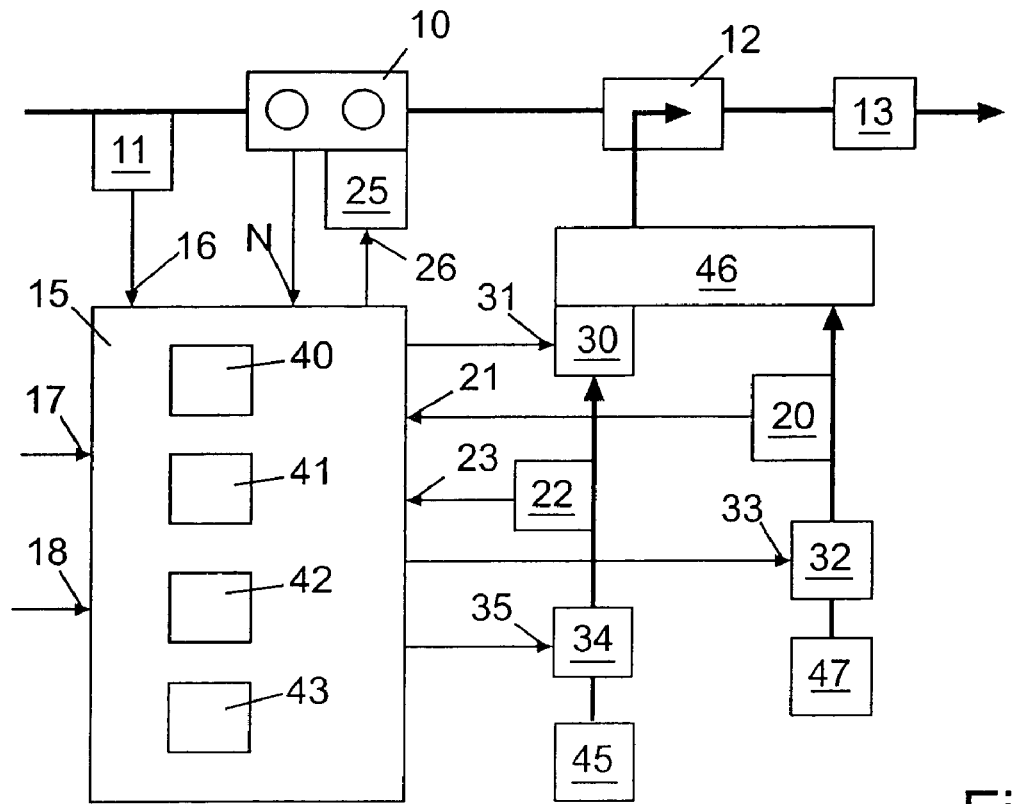
FIG. 1 shows a technical context in which a method according to the present invention proceeds.

FIG. 1 shows an internal combustion engine 10 in whose intake region an air sensor 11 is disposed, and in whose exhaust region a reagent medium introduction apparatus 12 and an exhaust gas treatment apparatus 13 are disposed. Air sensor 11 delivers an air signal 16 to a control system 15. Control system 15 furthermore has conveyed to it a rotation speed N supplied by internal combustion engine 10, a torque target value 17, an internal combustion engine operating signal 18, a compressed air pressure signal 21 supplied by a compressed air pressure sensor 20, and a reagent medium pressure signal 23 supplied by a reagent medium pressure sensor 22.

Control system 15 delivers a fuel signal 26 to a fuel metering apparatus 25 associated with internal combustion engine 10, a dosing valve triggering signal 31 to a dosing valve 30, a compressed air regulation valve triggering signal 33 to a compressed air regulation valve 32, and a reagent medium pump triggering signal 35 to a reagent medium pump 34.

Control system 15 contains a dosing valve triggering system 40, a compressed air regulation valve triggering system 41, a reagent medium pump triggering system 42, and a pressure sensor diagnosis unit 43.

The reagent medium stored in reagent medium tank 45 travels via reagent medium pump 34 and dosing valve 30 into a mixing chamber 46. Also conveyed to mixing chamber 46 is the compressed air supplied in a pressure vessel 47 and guided through compressed air regulation valve 32. Mixing chamber 46 is connected to reagent medium introduction apparatus 12.

Figure 2:
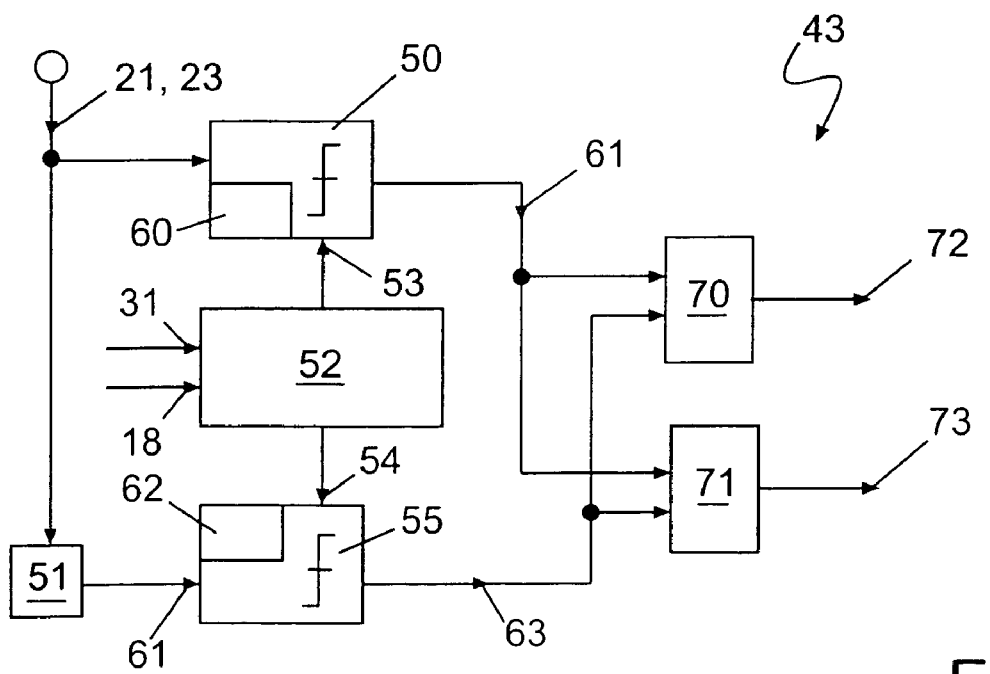
FIG. 2 is a block diagram of a diagnosis unit.

FIG. 2 shows, in detail, pressure sensor diagnosis unit 43 contained in control system 15. Compressed air pressure signal 21 and reagent medium pressure signal 23 (hereinafter referred to as pressure signal 21, 23 are conveyed to a first comparator 50 and to a signal evaluation system 51. A timer 52 triggers first comparator 50 with a first time signal 53, and a second comparator 55 with a second time signal 54. Metering valve triggering signal 31 and internal combustion operating signal 18 are conveyed to timer 52.

First comparator 50, which contains a first switchable reference 60, supplies a first fault signal 61. Signal evaluation system 51 delivers an evaluated pressure signal 61 to second comparator 55, which contains a second switchable reference 62 and supplies a second fault signal 63.

First fault signal 61 is made available to an OR element 70 and to an AND element 71. Second fault signal 63 is likewise conveyed to OR element 70 and to AND element 71. OR element 70 outputs a third fault signal 72, and AND element outputs a fourth fault signal 72.

Figure 3A:
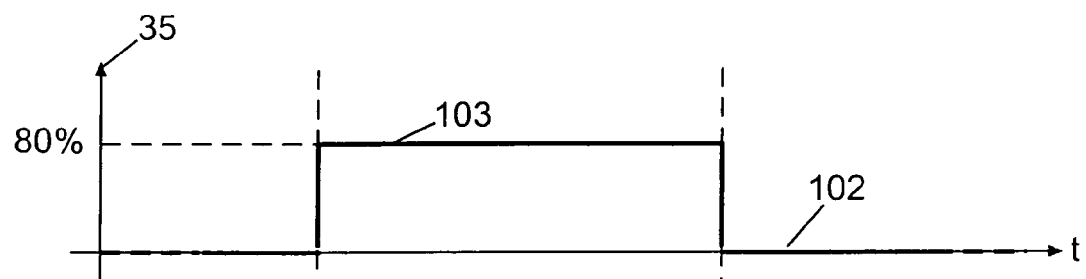
FIGS. 3a-3c show signal profiles as a function of time.
Figure 3B:
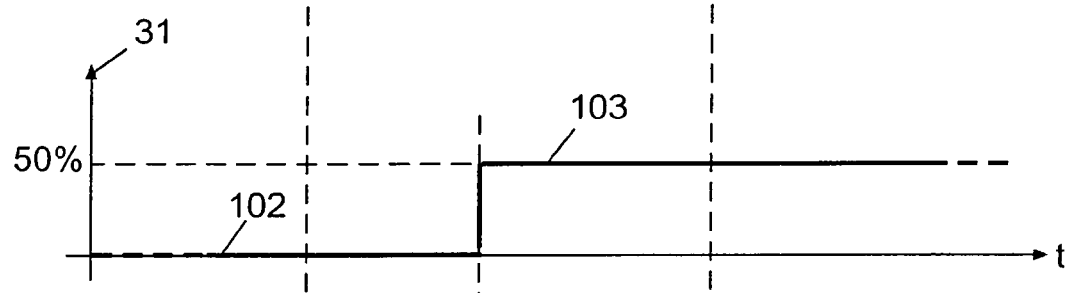
Figure 3C:
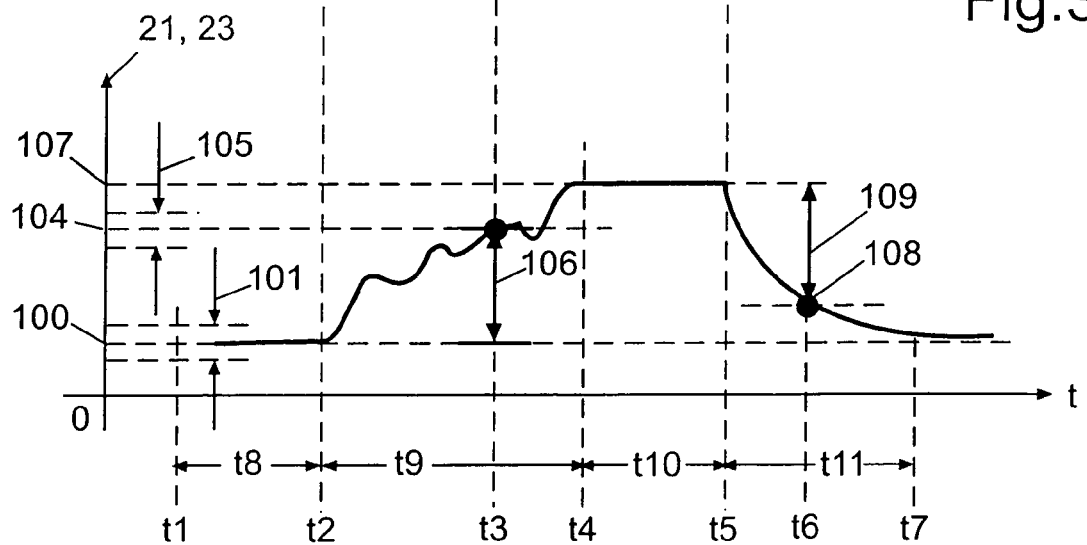

FIG. 3a shows reagent medium pump triggering signal 35 as a function of time t. FIG. 3b shows dosing valve triggering signal 31 as a function of time t, and FIG. 3c shows pressure signal 21, 23 as a function of time t.

At a first time t1, pressure signal 21, 23 exhibits a resting pressure 100 that lies within a first tolerance range 101.

At a second time t2, the reagent medium pump triggering signal changes from a switch-off level 102 to a switch-on level 103. After second time t2, a rise in pressure signal 21, 23 begins.

At a third time t3, dosing valve triggering signal 31 changes from switch-off level 102 to switch-on level 103. At third time t3, pressure signal 21, 23 exhibits a first test pressure 104 that lies within a second tolerance range 105. At third time t3, pressure signal 21, 23 exhibits a first pressure change 106 with respect to resting pressure 100.

At a fourth time t4, pressure signal 21, 23 exhibits an operating pressure 107.

At a fifth time t5, the reagent medium pump triggering signal changes from switch-on level 103 to switch-off level 102. After fifth time t5, pressure signal 21, 23 decreases.

At sixth time t6, pressure signal 21, 23 exhibits a second test pressure 108. Simultaneously, pressure signal 21, 23 exhibits a second pressure change 109 with respect to operating pressure 107.

At seventh time t7, pressure signal 21, 23 has decreased to resting pressure 100.

A first time interval t8 is located between first and second times t1, t2. A second time interval t9 is located between second and fourth times t2, t4. A further first interval t10 is located between the fourth and fifth times, and a further second time interval t11 between fifth and seventh times t5, t7.

The method according to the present invention works as follows:

After internal combustion engine 10 is put into operation by way of internal combustion engine operating signal 18, which is supplied e.g. by an ignition lock (not shown in further detail) of a motor vehicle, control system 15 defines fuel signal 26 as a function of at least one input signal. Air signal 16 supplied by air sensor 11 and/or rotation speed N supplied by internal combustion engine 10 and/or torque target value 17 derived from a position of an accelerator pedal (not shown in further detail) are provided, for example, as input signals.

Fuel signal 26 defines, for example, an injection time of fuel valves (not shown in further detail) that are disposed in fuel metering apparatus 25.

At least one exhaust gas component is removed from the exhaust gas of internal combustion engine 10 in exhaust gas treatment apparatus 13. Exhaust gas treatment apparatus 13 is, for example, a catalytic converter and/or a particle filter. The exemplifying embodiment shown is based on a catalytic converter that is embodied in particular as a selective catalytic reduction (SCR) converter. SCR converter 13, for example, uses ammonia to convert the nitrogen oxides contained in the exhaust gas into water and nitrogen. The ammonia can be introduced directly into the exhaust region upstream from SCR converter 13. In the exemplifying embodiment shown, it is assumed that reagent medium introduction apparatus 12 is provided, which introduces a urea-water solution, as a reagent medium, into the exhaust region upstream from SCR converter 13. The ammonia is obtained in the exhaust gas by hydrolysis, upstream from SCR converter 13 and in particular inside SCR converter 13.

The urea-water solution provided as reagent medium is stored in reagent medium tank 45, brought at least approximately to a predetermined reagent medium target pressure by reagent medium pump 34, and conveyed via dosing valve 30 to mixing chamber 46. Mixing chamber 46 can be omitted if no compressed air is mixed into the reagent medium. In this case dosing valve 30 can be coincident with reagent medium introduction apparatus 12. In the exemplifying embodiment shown, it is assumed that in mixing chamber 46, the reagent medium is mixed with compressed air that is supplied in pressure vessel 47. The compressed air pressure is adjusted, with compressed air regulating valve 32, at least approximately to a predetermined compressed air target pressure.

Both the reagent medium pressure and the compressed air pressure are sensed by pressure sensors 20, 22. Reagent medium pressure sensor 22 supplies reagent medium pressure signal 23, and compressed air pressure sensor 20 supplies compressed air pressure signal 21, these being once again referred to hereinafter as pressure signal 21, 23. When internal combustion engine 10 is put into operation with internal combustion operating signal 18, reagent medium pump triggering signal 35 is preferably supplied by reagent medium pump triggering system 42. Reagent medium pump 34 brings the reagent medium to a predetermined pressure of, for example, 4 bar. Reagent medium pump triggering system 42 can contain a closed-loop control system to which reagent medium pressure signal 23 is made available as an actual pressure value. The reagent medium quantity is predetermined using dosing valve 30, which applies to dosing valve triggering system 40 the dosing valve triggering signal 31 that, for example, enables a predetermined cross section of dosing valve 30.

The compressed air that is, if applicable, mixed into the reagent medium in mixing chamber 46 is likewise preferably regulated to a predetermined compressed air target pressure. For this purpose, compressed air regulating valve triggering system 41 defines compressed air regulating valve triggering signal 33 as a function of compressed air sensor pressure signal 21. The compressed air target pressure is, for example, 8 bar. Pressure vessel 47 is present in a motor vehicle in order to operate a braking system and/or a power-assisted steering system and/or other displacement drive systems, as applicable. A compressor may possibly be used. The compressed air pressure can be decreased, before mixer 46, to e.g. 4 bar, for example using a supercritical restrictor (not shown in further detail) and/or by way of the pressure loss of a check valve (not shown in further detail).

A malfunction or complete failure of reagent medium pressure sensor 22, and/or of compressed air pressure sensor 20 that is provided if applicable, has an influence on exhaust gas treatment, since the pressure contributes to determining the quantity of reagent medium and the spatial distribution in the exhaust gas conduit upstream from SCR converter 13. Overdosing can result in an ammonia breakout. The result of underdosing is that exhaust gas treatment apparatus 13 can no longer completely perform its purification function.

Provision is therefore made for diagnosis of reagent medium pressure sensor 22 and of compressed air pressure sensor 20 that is provided if applicable. The diagnosis is performed on the basis of pressure signals 21, 23 in pressure sensor diagnosis unit 43, whose configuration is shown in detail in FIG. 2.

The procedure essentially provides that firstly, in at least one first time interval t8, t10 in which a steady pressure state is expected in the presence of either resting pressure 100 or operating pressure 107, a check is made as to whether pressure signal 21, 23 at least approximately corresponds to steady-state pressure 100, 107. In addition, in at least one second time interval t9, t11 in which a pressure change occurs, a check is made as to whether pressure signal 21, 23 at least approximately corresponds to a predetermined test pressure and/or an expected pressure change 106, 109 has at least approximately occurred. Third and/or fourth fault signal 72, 73 is supplied if at least one of the conditions is not met.

The diagnosis operations are controlled by timer 52 as a function of internal combustion engine operating signal 18 and dosing valve triggering signal 31. Between first and second times t1, t2, corresponding to first time interval t8, timer 52 delivers first time signal 53 to first comparator 50, which thereupon checks pressure signal 21, 23 as to whether resting pressure 100 is at least approximately present. First comparator 50 compares pressure signal 21, 23 to the reference value, supplied by first switchable reference 60, that corresponds e.g. to ambient atmospheric pressure. First tolerance range 101 is defined in such a way that permissible tolerances do not cause first comparator 50 to supply first fault signal 61 because the reference value is exceeded.

Alternatively or additionally, provision can be made for timer 52 to trigger first comparator 50 between fourth and sixth times t4, t6, corresponding to further first time interval t10, using first time signal 53. In further first time interval t10, first comparator 50 checks whether pressure signal 21, 23 at least approximately exhibits operating pressure 107. In that case first switchable reference 60 is switched over, using first time signal 53, to a different reference value that is an indication of operating pressure 107.

If a deviation of pressure signal 21, 23 from resting pressure 100 or from operating pressure 107 was identified in at least one first time interval t8, t10, first fault signal 61 occurs and is outputted via OR element 70 directly as third fault signal 72. Third fault signal 72 can, for example, be displayed and/or stored in a fault memory (not shown in further detail).

Between second and fourth times t2, t4 corresponding to second time interval t9, and between fifth and seventh times t5, t7 corresponding to further second time interval t11, timer 52 supplies second time signal 54 for triggering second comparator 55.

According to a first embodiment, provision is made for second comparator 55 to compare pressure signal 61 evaluated by signal evaluation system 51 to a reference value supplied by second switchable reference 62. Signal evaluation system 51 calculates, for example, the differential quotient of pressure signal 21, 23 occurring in second time interval t9 or in further second time interval t11. One technically achievable possibility provides for at least one determination of the difference quotient of pressure signal 21, 23. The time interval to be taken as the basis for determining the difference quotient must be coordinated in terms of the expected behavior of the time-related behavior of sensor signal 21, 23, since as shown by the profile of pressure signal 21, 23 depicted in FIG. 3c, local maxima and minima can occur.

Alternatively or additionally, provision can be made for timer 52 to supply second time signal 54 at a defined point in time within second time interval t9 or further second time interval t11. In the exemplifying embodiment shown, second time signal 54 is supplied at third time t3 and/or at sixth time t6. At third time t3, dosing valve triggering signal 31 changes from switch-off level 102 to switch-on level 103. At third time t3 it is therefore assumed that operating pressure 107 has largely been reached. In fact, first test pressure 104 is present.

According to a first embodiment, provision can be made for second comparator 55 to check, at third time t3, whether the predetermined first and/or second test pressure 104, 108 is present. Signal evaluation system 51 is omitted in this embodiment, since second comparator 55 directly compares pressure signal 21, 23 to the reference value supplied by second switchable reference 62, which value is an indication of first test pressure 104 at third time t3 or an indication of second test pressure 108 at sixth time t6. Second tolerance range 105 must be adapted to first test pressure 104 expected at third time t3, and to second test pressure 108 expected at sixth time t6.

According to another embodiment, provision can be made for second comparator 55 to check whether the predetermined first pressure change 106 is present at third time t3, and/or whether second pressure change 109 is present at sixth time t6. This embodiment does require signal evaluation system 51, which at the third time ascertains the difference between the currently present pressure signal 21, 23 and resting pressure 100, and at the sixth time ascertains the difference between currently present pressure signal 21, 23 and operating pressure 107 present at fifth time t5.

Second fault signal 63 supplied by second comparator 55, which signal signals a fault that has occurred in second time interval t9 and/or in further second time interval t11, is outputted via OR element 70 directly as third fault signal 72. OR element 70 outputs third fault signal 72 if first fault signal 61 or second fault signal 63 or both fault signals 61, 63 occur. Fourth fault signal 73 is outputted by AND element 71 if both first fault signal 61 and second fault signal 63 are present. Because of the time sequence of the individual intervals t8, t9, t10, t11, provision must be made for storage (not shown in further detail) of fault signals 61, 63.

What is claimed is:

1. A method for introducing a reagent medium into an exhaust gas conduit of an internal combustion engine, in which at least one pressure sensor is provided, the method comprising:
   performing a diagnosis of the pressure sensor, which is at least for detecting the reagent pressure and which provides a pressure signal;
   checking, in at least one first time interval, predetermined by a timer, in which an operating pressure is expected, whether a pressure signal at least substantially corresponds to a steady-state pressure;
   checking, in at least one second time interval, predetermined by the timer, which is in the period following a controlling, during which the internal combustion engine is already switched off, and in which a pressure decrease is expected, a check is performed as to whether the pressure signal at least one of (a) at least substantially corresponds to a predetermined test pressure and (b) at least substantially exhibits a predetermined change with respect to the operating pressure; and
   supplying an error signal if the pressure signal does not correspond to the operating pressure in the first time interval, and if the pressure signal at least one of does not correspond to the predetermined test pressure and does not exhibit the predetermined change in the second time interval.

2. The method according to claim 1, wherein the fault signal is supplied if the pressure signal does not correspond to the operating pressure and if the pressure signal at least one of (a) does not correspond to the predetermined test pressure and (b) does not exhibit the predetermined change.

3. The method according to claim 1, wherein a pressureless state is intended to exist in a first time interval, and a check is made as to whether the pressure signal at least substantially corresponds to an ambient atmospheric pressure.

4. The method according to claim 1, wherein an operating pressure is intended to exist in a first time interval, and a check is made as to whether the pressure signal at least substantially corresponds to the operating pressure.

5. The method according to claim 1, wherein a check is made, at a measurement time located in a second time interval, as to whether the pressure signal at least substantially corresponds to a test pressure.

6. The method according to claim 1, wherein in a second time interval, at least one of a difference quotient and a differential quotient of a time profile of the pressure signal is ascertained and evaluated.

7. The method according to claim 1, wherein the pressure sensor senses at least one of a reagent medium pressure and a compressed air pressure.

8. The method according to claim 1, wherein the reagent medium travels via a pump and a dosing valve into a mixing chamber.

9. The method according to claim 1, wherein ammonia is used to convert nitrogen oxides contained in the exhaust gas into water and nitrogen.

10. The method according to claim 9, wherein the ammonia is obtained in the exhaust gas by hydrolysis.

11. The method according to claim 9, wherein the ammonia can be introduced directly into the exhaust region upstream from a selective catalytic reduction converter.

12. The method according to claim 1, wherein:
   the fault signal is supplied if the pressure signal does not correspond to the operating pressure and if the pressure signal at least one of (a) does not correspond to the predetermined test pressure and (b) does not exhibit the predetermined change,
   a check is made, at a measurement time located in a second time interval, as to whether the pressure signal at least substantially corresponds to a test pressure,
   in a second time interval, at least one of a difference quotient and a differential quotient of a time profile of the pressure signal is ascertained and evaluated, and
   the pressure sensor senses at least one of a reagent medium pressure and a compressed air pressure.

13. The method according to claim 12, wherein one of the following is satisfied: (i) a pressureless state is intended to exist in a first time interval, and a check is made as to whether the pressure signal at least substantially corresponds to an ambient atmospheric pressure; and (ii) an operating pressure is intended to exist in a first time interval; and a check is made as to whether the pressure signal at least substantially corresponds to the operating pressure.

14. An apparatus for introducing a reagent medium into an exhaust gas conduit of an internal combustion engine, in which at least one pressure sensor is provided, the apparatus comprising:
   a diagnostic arrangement to diagnose the pressure sensor, which is at least for detecting the reagent pressure and which provides a pressure signal;
   a first checking arrangement to check, in at least one first time interval, predetermined by a timer, in which an operating pressure is expected, whether a pressure signal at least substantially corresponds to a steady-state pressure;
   a second checking arrangement to check, in at least one second time interval, predetermined by the timer, which is in the period following a controlling, during which the internal combustion engine is already switched off, and in which a pressure decrease is expected, a check is performed as to whether the pressure signal at least one of (a) at least substantially corresponds to a predetermined test pressure and (b) at least substantially exhibits a predetermined change with respect to the operating pressure; and
   an error arrangement to supply an error signal if the pressure signal does not correspond to the operating pressure in the first time interval, and if the pressure signal at least one of does not correspond to the predetermined test pressure and does not exhibit the predetermined change in the second time interval.

15. The apparatus according to claim 14, wherein the fault signal is supplied if the pressure signal does not correspond to the operating pressure and if the pressure signal at least one of (a) does not correspond to the predetermined test pressure and (b) does not exhibit the predetermined change.

16. The apparatus according to claim 14, wherein a pressureless state is intended to exist in a first time interval, and a check is made as to whether the pressure signal at least substantially corresponds to an ambient atmospheric pressure.

17. The apparatus according to claim 14, wherein an operating pressure is intended to exist in a first time interval, and a check is made as to whether the pressure signal at least substantially corresponds to the operating pressure.

18. The apparatus according to claim 14, wherein a check is made, at a measurement time located in a second time interval, as to whether the pressure signal at least substantially corresponds to a test pressure.

19. The apparatus according to claim 14, wherein in a second time interval, at least one of a difference quotient and a differential quotient of a time profile of the pressure signal is ascertained and evaluated.

20. The apparatus according to claim 14, wherein the pressure sensor senses at least one of a reagent medium pressure and a compressed air pressure.

21. The apparatus according to claim 14, wherein:
the fault signal is supplied if the pressure signal does not correspond to the operating pressure and if the pressure signal at least one of (a) does not correspond to the predetermined test pressure and (b) does not exhibit the predetermined change,
a check is made, at a measurement time located in a second time interval, as to whether the pressure signal at least substantially corresponds to a test pressure,
in a second time interval, at least one of a difference quotient and a differential quotient of a time profile of the pressure signal is ascertained and evaluated, and
the pressure sensor senses at least one of a reagent medium pressure and a compressed air pressure.

22. The apparatus according to claim 21, wherein one of the following is satisfied: (i) a pressureless state is intended to exist in a first time interval, and a check is made as to whether the pressure signal at least substantially corresponds to an ambient atmospheric pressure; and (ii) an operating pressure is intended to exist in a first time interval; and a check is made as to whether the pressure signal at least substantially corresponds to the operating pressure.

23. The apparatus according to claim 22, wherein the reagent medium travels via a pump and a dosing valve into a mixing chamber, and wherein ammonia is used to convert nitrogen oxides contained in the exhaust gas into water and nitrogen.

24. The apparatus according to claim 23, wherein the ammonia is obtained in the exhaust gas by hydrolysis.

25. The apparatus according to claim 23, wherein the ammonia can be introduced directly into the exhaust region upstream from a selective catalytic reduction converter.

* * * * *